United States Patent Office 2,740,974
Patented Apr. 10, 1956

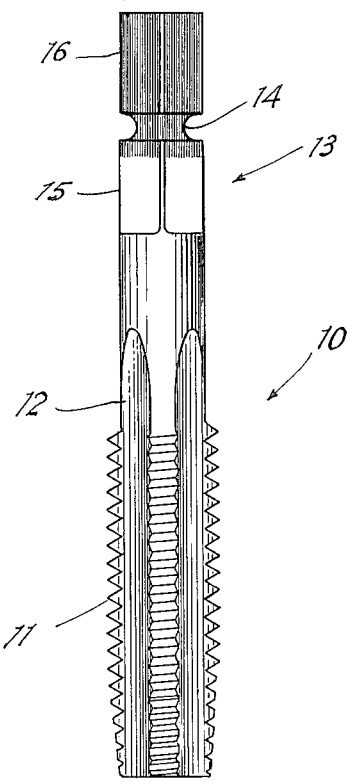

2,740,974

ROTARY METAL CUTTING TOOL HAVING A LOCALLY ANNEALED SHANK PORTION

Lazarus Lewis, Brooklyn, N. Y.

Application March 15, 1954, Serial No. 416,197

4 Claims. (Cl. 10—141)

This invention relates to metal cutting tools such as taps and the like.

Taps are formed of hardened metal to insure proper cutting action and to increase the life of the cutting threads. The hardening and tempering of the tool produces a condition of brittleness and results in breakage of the tool when improperly used or when unexpected resistance is offered to the turning of the tool. Such breakage causes great inconvenience since the broken portion of the tool within the work is removed with great difficulty.

It has been proposed to provide taps with weakened portions on the shanks thereof to deliberately localize the point of fracture and to provide a protruding shank portion after fracture which may be engaged by a wrench to remove the broken tap. It has also been proposed to provide taps with shanks of extended length and successively spaced weakened sections to allow reuse of the tap after each fracture.

The object of this invention is to provide an improved tool of the character described having a shank adapted to fracture at a localized point in response to excessive stresses or strains, yet giving warning to the operator of the approach of such stresses and strains prior to actual fracture.

Another object of this invention is to provide a metal cutting tool of the character described which includes means for localizing excessive stresses in a shank portion thereof and adapted to give advance indication of stresses which would result in fracture prior to the incidence of such stresses whereby fracture is avoided and the tool with its stress indicating means may be used repeatedly.

Still another object of this invention is to provide a tap or the like having a shank with a portion of reduced section which would fracture at stress values less than that at which the cutting portion of the tap would fracture, the shank portion of lesser brittleness than other portions of the tap whereby the shank may be angularly displaced relative to the cutting portion without fracture.

Yet another object of this invention is to provide a tool of the character described which includes a hardened metal cutting portion and a locally annealed shank portion which may be subjected to a twisting action without fracture whereby excessive stresses which would fracture the cutting portion may be sensed by the tool operator before fracture takes place.

Yet a further object of this invention is to provide a tap or the like having a shank of conventional longitudinal and transverse dimensions, the shank having a weakened portion which is of reduced brittleness whereby the tap may be used in a conventional manner yet give indication in advance of fracture producing strains.

Other objects of this invention will in part be obvious and in part hereinafter pointed out.

In the drawing, the figure shows a tool embodying the invention in the form of a tap.

As shown in the figure, 10 designates a tap embodying the invention, the same comprising the threading portion 11 with flutes 12. A shank 13 extends from the portion 11 and is of the usual square section to receive the tap wrench for turning the tap to thread an opening in the work.

The shank 13 is formed with an annular groove 14 intermediate the ends thereof to provide a weakened portion separating an inner shank portion 15 and an outer shank portion 16.

The tap 10 is formed of hardened steel to insure long life to the metal cutting and threading portion 11. However the hardened metal is of a brittle character which may result in fracture of the tap when improperly used or excessive stresses are encountered in the tapping operation. With the incidence of such excessive stresses, fracture would be localized at the weakened portion at groove 14, thus allowing the shank portion 15 to be engaged by a wrench to remove the tap from the work.

However, tap 10 is treated to give advance warning of fracture producing stresses, thereby avoiding actual fracture and allowing the tap in its original form to be removed from the work and reused. To this end, the weakened shank portion 14 is treated to reduce the brittleness thereof, as by localized annealing, as indicated by the shading of shank portions 14, 16. It is understood that the annealing treatment may be confined to the groove 14 or may extend to adjacent portions of the shank on either side thereof.

It is apparent, that with the weakened shank portion 14 of lesser brittleness than the threading portion 11, as the tap is being turned by a wrench in the hands of the operator, any excessive stresses or strains incident to the tapping operation will be translated into an angular twist of the metal in weakened shank portion 14 relative to cutting portion 11. The operator will promptly sense such twisting action by the feel of the wrench as he applies the turning force thereto and with due warning, will promptly stop further turning of the wrench. It follows that stresses which may be of a value sufficient to result in a fracture at weakened shank portion 14 may be anticipated, thereby leaving the tap in unbroken form, readily removable from the work and reusable.

It has been found that with an ordinary localized annealing of the weakened shank portion 14, angular displacement of shank portion 16 relative to shank portion 15 may be of an order of 90° or more before fracture takes place. Since in the usual situation, the operator may quickly sense excessive stresses, the actual angular displacement may be a matter of a few degrees, which allows the tool to be reused a number of times with concurrent twisting actions, before actual fracture takes place. When fracture occurs, the tap may still be removed from the work by engaging shank portion 15 with the tap wrench.

The depth of groove 14 in shank 13 may be correlated with the annealing treatment to provide yield points of predetermined value in ratio to the yield point of the tap as a whole.

No special tools are required to remove the tap 10 from the work and a C washer may be provided for use on the shank to avoid misplacement of the tap wrench. Since the tap has a shank of conventional dimensions, the tool may be utilized in the usual manner and with ordinary wrenches.

While various changes might be made in the embodiment of the invention shown and described herein without departing from the spirit thereof, it is to be understood that all matter herein disclosed is to be interpreted as illustrative and not by way of limitation.

Having thus disclosed my invention, I claim as new and desire to protect by Letters Patent:

1. A tool formed of hardened metal comprising a metal cutting portion and a shank including a polygonal driving portion extending from said metal cutting portion, said polygonal shank portion being formed with an annular groove to weaken said grooved portion, said weakened shank portion being locally annealed to reduce the brittleness thereof and to permit substantial angular displacement of said shank portion relative to said cutting portion before fracture.

2. A tap having a metal cutting portion and a shank including a polygonal driving portion extending from said metal cutting portion, said polygonal shank portion being grooved at a selected portion thereof to cause fracture when resistive forces incident to the turning of the tap in work exceed predetermined values, said shank being locally annealed to provide reduced brittleness and to give indication of the incidence of said resistive force values prior to fracture.

3. A tool having a metal cutting portion and a shank including a polygonal driving portion extending from said metal cutting portion, said polygonal shank portion having an annular groove intermediate the ends thereof, the grooved portion of said shank being locally annealed and of reduced brittleness as compared to the cutting portion.

4. A tool having a metal cutting portion and a shank including a polygonal driving portion extending from said metal cutting portion, said polygonal shank portion being grooved and locally annealed to allow angular twist of said driving shank portion relative to said metal cutting portion at stress values less than stress values which will cause fracture of said metal cutting portion.

References Cited in the file of this patent

UNITED STATES PATENTS 1,317,624    Herrman _____ Sept. 30, 1919

FOREIGN PATENTS 562,657    Great Britain _____ July 11, 1944